United States Patent [19]

Icenogle et al.

[11] Patent Number: 4,622,350
[45] Date of Patent: Nov. 11, 1986

[54] LOW SMOKE POLYPROPYLENE INSULATION COMPOSITIONS

[75] Inventors: Ronald D. Icenogle, Spokane, Wash.; Lie K. Djiauw, Houston, Tex.

[73] Assignee: Shell Oil Company, Houston, Tex.

[21] Appl. No.: 814,706

[22] Filed: Dec. 30, 1985

[51] Int. Cl.$^4$ .......................... C08K 9/06; C08K 9/04; C08K 3/22

[52] U.S. Cl. .................................. 523/200; 523/212; 524/275; 524/436; 524/437; 524/505

[58] Field of Search ................ 523/200, 212; 524/275, 524/437, 436, 505

[56] References Cited

U.S. PATENT DOCUMENTS

| | | | |
|---|---|---|---|
| 2,969,345 | 1/1961 | Coover et al. ..................... | 260/93.7 |
| 3,480,580 | 11/1969 | Joyner et al. ..................... | 260/29.6 |
| 3,481,910 | 12/1969 | Brunson .............................. | 260/78.4 |
| 3,595,942 | 7/1971 | Wald et al. .......................... | 260/880 |
| 3,793,283 | 2/1974 | Frailey et al. ...................... | 524/505 |
| 3,919,176 | 11/1975 | Meyer et al. ........................ | 260/78.4 |
| 4,110,303 | 8/1978 | Gergen et al. ................... | 260/875 G |
| 4,373,039 | 2/1983 | Mueller et al. ...................... | 524/436 |
| 4,489,187 | 12/1984 | Middlebrook ...................... | 524/436 |
| 4,582,871 | 4/1986 | Noro et al. ........................... | 524/437 |

*Primary Examiner*—Lewis T. Jacobs
*Attorney, Agent, or Firm*—Peter A. Bielinski

[57] ABSTRACT

This invention relates to a resin composition comprising polypropylene, a hydrogenated mono alkylarene-conjugated diene block copolymer, a functionalized low molecular weight polypropylene wax, oil, and a hydrated inorganic filler which can be blended to form a self-extinguishing, low smoke and halogen free insulation composition which exhibits high ultimate elongation and is relatively easy to process.

19 Claims, No Drawings

LOW SMOKE POLYPROPYLENE INSULATION COMPOSITIONS

This invention relates to a resin composition comprising polypropylene, a modified low molecular weight polypropylene wax, a hydrogenated mono alkylarene-conjugated diene block copolymer, oil, and a treated filler which can be blended to form a self-extinguishing, low smoke and halogen free insulation composition which exhibits high ultimate elongation and is relatively easy to process.

BACKGROUND OF THE INVENTION

This application is related to U.S. application Ser. No. 814,705 which is being filed concurrently herewith.

The most common method for reducing the flammability of wire and cable insulation and jacketing materials is the use of an organic bromine or chlorine compound along with antimony oxide. This system is very effective as a flame retardant, but such materials produce a dense black smoke when burned, and also produce hydrogen chloride or hydrogen bromide, which are both corrosive and toxic. Because of this, there has been a great deal of interest in flame retarded systems that produce lower amounts of smoke and toxic and corrosive gases when they are burned. There appear to be two main approaches that are being followed to meet this goal. The first is to eliminate halogens from the system and use instead large loadings of alumina trihydrate, another common fire retardant, or the similar filler magnesium hydroxide. The second is to develop additives that reduce the smoke and acid gas production of the halogenated systems. In addition to low smoke low toxicity these compositions must also have attractive physical properties in order to be used for wire and cable applications. These properties include hardness, abrasion resistance, environmental stability, deformation resistance, low temperature flexibility, oil resistance and good electrical properties. At present there are no low-smoke, low-toxicity, flame-retardant materials which are readily available although some new materials including metal hydrate filled polyethylene are becoming available.

Metal hydrates such as alumina trihydrate and magnesium hydroxide contain water bonded to a crystal structure with the metal atom. When heated to a sufficiently high temperature these compounds decompose and release water which subsequently vaporizes. This process of decomposition and vaporization absorbs heat, thus slowing down the initial heating of the insulation material and consequently slows down the subsequent burning of the material. After this cooling effect is overwhelmed however, the presence of the metal hydrates has little effect on the subsequent process of burning. Unlike the halogenated flame retardant composition, metal hydrate compositions with non-halogenated polyolefins break down quickly into monomer units and burn relatively cleanly without a great deal of smoke production. In addition, since metal hydrates only add water to the system, they should not increase the emission of toxic or corrosive gases beyond what already would be produced by the system.

Polypropylene, which is readily available at a reasonable cost, has found many industrial uses because of its desirable physical properties, such as ease of fabrication by all conventional methods; high melting point of stereoregular, e.g., isotactic, polypropylene and compatibility with many other commercial resins, which permits a large number of blends having specific properties. Brittleness in these compositions can be reduced either by copolymerizing propylene with ethylene to form block copolymers or by blending homopolypropylene with rubbers.

Magnesium hydroxide fillers along with alumina trihydrate fillers have been used in flame retardant polypropylene compositions. Alumina trihydrate is generally more effective as a flame retardant than is magnesium hydroxide due to the greater amount of water incorporated in that filler, however, magnesium hydroxide has specific advantages, for example, better processability when incorporated into a polyolefin composition and a higher decomposition temperature than alumina trihydrate (330° C. versus 230° C.). This increased decomposition temperature allows a flame retardant polymer composition containing magnesium hydroxide to be processed at a higher temperature than a compound with alumina trihydrate. The higher processing temperatures allow faster processing due to lower viscosities.

It has been found however that conventional magnesium hydroxide fillers cannot be successfully blended into rubber modified polypropylene compositions. These compositions when filled to a reasonable loading of magnesium hydroxide cannot be processed due to agglomeration of the filler particles. Accordingly, it would be desirable to provide a magnesium hydroxide filler which would not adversely affect the processability by agglomeration. In addition, it is desirable to increase the tensile strength of these compositions. It has been found that the addition of a small amount of maleic anhydride functionalized polypropylene wax to the composition dramatically increases the tensile strength of these compositions.

SUMMARY OF THE INVENTION

According to the present invention there is provided a magnesium hydroxide filled rubber modified, functionalized low molecular weight polypropylene wax containing polypropylene composition having good physical properties, good processability, good flame retardancy and low production of toxic and corrosive gases when burned, said composition comprising (1) between about 1 and about 40 weight percent of a homopolypropylene,
(2) between 5 and 40 percent by weight of a hydrogenated monoalkyl arene-(A)-conjugated diene (B) block copolymer containing at least two A blocks and at least one B block,
(3) between about 0.25 and 10 percent by weight of a functionalized low molecular weight polypropylene wax,
(4) between 1 and about 20 percent by weight of a hydrocarbon extending oil, and
(5) between about 10 and about 85 percent by weight of a magnesium hydroxide filler which has been surface treated with a coupling agent.

DETAILED DESCRIPTION OF THE INVENTION

The compositions of the present invention are prepared by combining the required components in the correct proportions in conventional blending equipment such as a rubber mill or mixer, for example, a Banbury mixer. This is usually done above the melting temperature of the polymeric materials.

POLYPROPYLENE

The homopolypropylene preferably should be isotactic and may be, for example, of the type corresponding to Shell PP-5944 S, PP-5520 and PP DX-5088, available from Shell Chemical Company, Houston, Texas. Most commercial isotactic polypropylenes are suitable in the compositions of this invention. Syndiotactic homopolymers also can be used. Modified polypropylenes, for example, maleic anhydride functionalized polypropylene of the type corresponding to Plexar 2110, available from Northern Petrochemical Company, Rolling Meadows, Ill., may also be used in the compositions of this invention. The functionalized polypropylenes are readily prepared according to procedures described in U.S. Pat. Nos. 3,480,580 or 3,481,910, which are hereby incorporated by reference.

FILLERS

The fillers used in the present invention are the hydrated inorganic fillers, e.g. hydrated aluminum oxides ($Al_2O_3 \cdot 3H_2O$ or $Al(OH)_3$) hydrated magnesia, hydrated calcium silicate and zinc borate. Of these compounds, the most preferred are hydrated aluminum oxide and magnesium hydroxide.

The magnesium hydroxide fillers useful in the compositions of the present invention may be surface treated with a coupling agent to prevent agglomeration of the particles. When agglomeration occurs the effective particle size of the filler is increased dramatically and therefore the processability and the properties of the end product are degraded. Surfactants which are useful in the invention may include fatty acid salts, for example, oleates and stearates, also maleates, silanes, zirco-aluminates, titanates, etc. It has also been found that magnesium hydroxide fillers with a high aspect ratio crystallate shape and larger size are also less likely to agglomerate than those with a lower aspect ratio. Aspect ratios for the crystallites should be greater than 4 and mean secondary particle (agglomerate) size should be less than three microns. Preferably, the mean secondary particle size should be about 0.6 to about 1.2 microns.

FUNCTIONALIZED LOW MOLECULAR WEIGHT POLYPROPYLENE WAX

Functionalized low molecular weight polypropylene waxes are well known in the art and may be prepared, for example, from polymers prepared according to the procedures described in U.S. Pat. Nos. 2,969,345 and 3,919,176 which are herein incorporated by reference.

A particularly preferred functionalized low molecular weight polypropylene wax is a normally solid thermoplastic ethylene-based polymer modified by monomers having reactive carboxylic acid groups, particularly a copolymer of a major proportion of ethylene and a minor proportion, typically from 1 to 30, preferably from 2 to 20, percent by weight, of an ethylenically unsaturated carboxylic acid. Specific examples of such suitable ethylenically unsaturated carboxylic acids (which term includes mono- and polybasic acids, acid anhydrides, and partial esters of polybasic acids) are acrylic acid, methacrylic acid, crotonic acid, fumaric acid, maleic acid, itaconic acid, maleic anhydride monomethyl maleate, monoethyl maleate, monomethyl fumarate, monoethyl fumarate, tripropylene glycol monomethyl ether acid maleate, or ethylene glycol monophenyl ether acid maleate. The carboxylic acid monomer is preferably selected from $\alpha,\beta$-ethylenically unsaturated mono- and polycarboxylic acids and acid anhydrides having from 3 to 8 carbon atoms per molecule and partial esters of such polycarboxylic acid wherein the acid moiety has at least one carboxylic acid group and the alcohol moiety has from 1 to 20 carbon atoms. The copolymer can also contain other copolymerizable monomers including an ester of acrylic acid. The comonomers can be combined in the copolymer in any way, e.g., as random copolymers, as block or sequential copolymers, or as graft copolymers. Materials of these kinds and methods of making them are readily known in the art. Specific examples of such copolymers are ethylene acrylic acid copolymer, ethylene methacrylic acid copolymer, ethylene maleic acid copolymer and the like.

Functionalized low molecular weight polypropylene wax is available from, for example, Eastman Chemical Products Inc. as Epolene E43, etc.

BLOCK COPOLYMERS

The hydrogenated monoalkyl arene-conjugated diene block copolymers useful in the present invention are well known in the art. This block copolymer, as defined in U.S. Pat. No. 4,110,303, among other patents, has at least two monoalkenyl arene polymer end blocks A and at least one polymer mid block B selected from the group consisting of substantially completely hydrogenated conjugated diene polymer blocks, ethylene-propylene polymer blocks and ethylene-butene polymer blocks. The block copolymers employed in the present invention may have a variety of geometrical structures, since the invention does not depend on any specific geometrical structure, but rather upon the chemical constitution of each of the polymer blocks. Thus, the structures may be linear, radial or branched so long as each copolymer has at least two polymer end blocks A and at least one polymer mid block B as defined above. Methods for the preparation of such polymers are known in the art. Particular reference will be made to the use of lithium based catalysts and especially lithium alkyls for the preparation of the precursor polymers (polymers before hydrogenation). U.S. Pat. No. 3,595,942 not only describes some of the polymers of the present invention but also describes suitable methods for their hydrogenation. The structure of the polymers is determined by their method of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with multifunctional coupling agents such as dihaloalkanes or alkenes and divinyl benzene as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene (SBS)
polystyrene-polyisoprene-polystyrene (SIS)
poly(alpha-methylstyrene)-polybutadiene-poly(alpha-methylstyrene) and
poly(alpha-methylstyrene)-polyisoprene-poly(alpha-methylstyrene).

It will be understood that both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The term "monoalkenyl arene" will be taken to include especially styrene and its analogs and homologs including alpha-methylstyrene and ring-substituted styrenes, particularly ring-methylated styrenes. The preferred monoalkenyl arenes are styrene and alpha-methylstyrene, and styrene is particularly preferred. The blocks B may comprise homopolymers of butadiene or isoprene and copolymers of one of these two dienes with a monoalkenyl arene as long as the blocks B predominate in conjugated diene units. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles a regular copolymer block of ethylene and butene-1 (EB). If the conjugated diene employed is isoprene, the resulting hydrogenated produce is or resembles a regular copolymer block of ethylene and propylene (EP). Ethylene-butene or ethylene-propylene blocks prepared via direct polymerization and not by hydrogenation of conjugated diene polymer blocks are also contemplated by the present invention.

Hydrogenation of the precursor block copolymers, if required, is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

The average molecular weights of the individual blocks may vary within certain limits. In most instances, the monoalkenyl arene blocks will have number average molecular weights in the order of 5,000–125,000, preferably 7,000–60,000 while the conjugated diene blocks either before or after hydrogenation will have average molecular weights in the order of 10,000–300,000, preferably 30,000–150,000. The total average molecular weight of the block copolymer is typically in the order of 25,000 to about 250,000, preferably from about 35,000 to about 200,000. These molecular weights are most accurately determined by tritium counting methods or osmotic pressure measurements.

The proportion of the monoalkenyl arene blocks should be between about 8 and 55% by weight of the block copolymer, preferably between about 10 and 35% by weight.

ADDITIONAL COMPONENTS

In addition, The present composition may contain other components such as plasticizers, e.g., saturated hydrocarbon or mineral oils, hydrogenated or saturated hydrocarbon resins or a styrene butadiene diblock copolymer along with additives such as stabilizers and oxidation inhibitors. Aliphatic oils and resins are preferred to aromatic oils and resins since aromatics tend to cyclacize resulting in color bodies. Preferred oils are primarily aliphatic, saturated mineral oils. Preferred resins are saturated or hydrogenated hydrocarbon resins, such as hydrogenated polymers of dienes and olefins. These additional components must be compatible with the block copolymer component. The selection of the other components depends upon a number of factors—e.g., the method for coating a wire.

As stated above, the compositions may be modified with supplementary materials such as stabilizers and oxidation inhibitors. Stabilizers and oxidation inhibitors are typically added to the compositions in order to protect the polymers against degradation during preparation and use of the composition. Combinations of stabilizers are often more effective, due to the different mechanisms of degradation to which various polymers are subject. Certain hindered phenols, organo-metallic compounds, aromatic amines and sulfur compounds are useful for this purpose. Especially effective types of these materials include the following:

1. Benzothiazoles, such as 2-(dialkyl-hydroxybenzyl-thio)benzothiazoles.
2. Esters of hydroxybenzyl alcohols, such as benzoates, phthalates, stearates, adipates or acrylates of 3,5-dialkyl-1-hydroxy-benzyl alcohols.
3. Stannous phenyl catecholates.
4. Zinc dialkyl dithiocarbamates.
5. Alkyl phenols, e.g., 2,6-di-tert-butyl-4-methyl phenol.
6. Dilaurylthio-dipropionate (DLTDP).

Examples of commercially available antioxidants are "Ionox 220" 4,4-methylene-bis(2,6-di-t-butyl-phenol) and "Ionox 330" 3,4,6-tris(3,5-di-t-butyl-p-hydroxybenzyl)-1,3,5-trimethylbenzene, "Dalpac 4C" 2,6-di-(t-butyl)-p-cresol, "Naugawhite" alkylated bisphenol, "Butyl Zimate" zinc dibutyl dithiocarbamate, and "Agerite Geltrol" alkylated-arylated bisphenolic phosphite. From about 0.01 percent to about 5.0 percent by weight of one or more antioxidants is generally added to the composition.

TABLE I

| | Typical | Preferred | Most Preferred |
|---|---|---|---|
| Block Copolymer | 5–40 | 10–30 | 15–20 |
| Plasticizer (oil) | 1–20 | 2–15 | 4–8 |
| Polypropylene | 1–40 | 2–20 | 4–8 |
| Functionalized Low Molecular Weight Polypropylene Wax | 0.25–10 | 0.5–5 | 1–2 |
| Filler | 10–85 | 40–75 | 63–75 |

The particular amounts of each component may vary somewhat in the resultant composition depending on the components employed and their relative amounts.

EXAMPLES

The following examples are given to illustrate the invention and are not to be construed as limiting.

The components used were as follows:

Block Copolymer 1 is a S-EB-S with GPC block molecular weights of about 29,000-125,000-29,000.

The oil was Penreco 4434 oil available from Penreco Company. The polypropylene was homopolypropylene PP 5520 from Shell Chemical Copany. The functionalized low molecular weight polypropylene wax was maleic anhydride functionalized low molecular weight polypropylene wax available from Eastman Chemical Products Inc. as Epolene E43. The Mg(OH)$_2$ was from Ventron division of Morton Thiocol Inc. with a secondary (aggregate) particle size of about 4 microns. Surface treated Mg(OH)$_2$ was Kisuma 5B from Kyowa Chemical Industry Ltd. which is oleate treated and has an average secondary (aggregate) particle size of about 0.8 microns.

ANTIOXIDANTS

Irganox 1010; tetra-bismethylene 3-(3,5-ditertbutyl-4 hydroxyphenyl)-propionate methane from Ciba-Geigy.

Irganox MD-1024; stabilizers from Ciba-Geigy.

DLTDP; Plastanox DLTDP, American Cyanamid.

Compositions are in percent by weight.

Examples were extruded insulation coating on 18AWG solid conductor 30 mils samples. All insulation coatings were conducted at 190 deg. C. melt temperature.

Control Example LR 8506 shows properties of the composition without the functionalized low molecular weight polypropylene wax component. The examples according to the invention showed significantly increased tensile strength expressed as stress at break. Higher amounts of the functionalized low molecular weight polypropylene wax tended to produce brittle compositions.

TABLE II

|  | LR 8506 | IC 1159 | IC 1159A | IC 1160 | IC 1160A | IC 1161 | IC 1161A |
|---|---|---|---|---|---|---|---|
| Block Copolymer 1 | 16.00% | 16.90% | 16.90% | 14.40% | 14.40% | 9.40% | 9.40% |
| Oil | 8.00% | 5.00% | 5.00% | 5.00% | 5.00% | 5.00% | 5.00% |
| Polypropylene | 5.00% | 5.00% | 5.00% | 5.00% | 5.00% | 5.00% | 5.00% |
| Modified Low MW PP | — | 2.50% | 2.50% | 5.00% | 5.00% | 10.00% | 10.00% |
| ATH | — | — | — | — | — | — | — |
| Surface Treated Mg(OH)$_2$ | 70.40% | 70.00% | 70.00% | 70.00% | 70.00% | 70.00% | 70.00% |
| Irganox 1010 | 0.25% | 0.25% | 0.25% | 0.25% | 0.25% | 0.25% | 0.25% |
| Irganox 1024 | 0.10% | 0.10% | 0.10% | 0.10% | 0.10% | 0.10% | 0.10% |
| DLTDP | 0.25% | 0.25% | 0.25% | 0.25% | 0.25% | 0.25% | 0.25% |
| Stress at Break (psi) | 400 | 1080 | 1030 | 1550 | 1550 | Brittle | Brittle |
| Elongation at Break (%) | 370 | 0 | 0 | 0 | 0 | — | — |
| Line speed (FPM) | 250 | 45 | 250 | 50 | 250 | 45 | 250 |
| Screw speed (RPM) | 150 | 29 | 140 | 28 | 140 | 31 | 130 |
| Power Input (AMP) | 10 | 15 | 20.5 | 13 | 20 | 11 | 16 |
| Head Pressure (psi) | 1340 | 3200 | 3400 | 2800 | 3200 | 2200 | 2500 |
| Limiting Oxygen Index % | 31.0 | 31.5 | 31.5 | 29.0 | 29.0 | — | — |

What is claimed is:

1. A flame retardant insulation composition comprising:
   (a) 5–40 percent by weight of a hydrogenated monoalkyarene (A)-conjugated diene (B) block copolymer containing at least two A blocks and at least one B block;
   (b) 1–20 percent by weight of a plasticizer;
   (c) 1–40 percent by weight of polypropylene;
   (d) 0.25–10 percent by weight of a functionalized low molecular weight polypropylene wax;
   (e) 10–85 percent by weight of a hydrated inorganic filler.

2. The compositions of claim 1 wherein the block copolymer is a hydrogenated styrene butadiene styrene block copolymer.

3. The composition of claim 1 wherein the filler is magnesium hydroxide.

4. The composition of claim 3 wherein the magnesium hydroxide is surface treated with a coupling agent.

5. The composition of claim 4 wherein the coupling agent is a fatty acid metal salt.

6. The composition of claim 4 wherein the coupling agent is an oleate.

7. The composition of claim 4 wherein the coupling agent is a stearate.

8. The composition of claim 4 wherein the coupling agent is a maleate.

9. The composition of claim 4 wherein the coupling agent is a silane.

10. The composition of claim 4 wherein the coupling agent is a titanate.

11. The composition of claim 4 wherein the coupling agent is a zirco-aluminate.

12. The composition of claim 1 wherein the filler is alumina trihydrate.

13. The composition of claim 1 wherein the low molecular weight polypropylene wax is a maleic anhydride functionalized low molecular weight polypropylene wax.

14. The composition of claim 1 wherein the plasticizer is a mineral oil.

15. The composition of claim 1 wherein the plasticizer is a styrene butadiene diblock copolymer.

16. The composition of claim 4 wherein the hydrated magnesium hydroxide has a mean secondary particle size of about 0.6 to about 1.2 microns.

17. The composition of claim 4 wherein the hydrated magnesium hydroxide has a crystallite aspect ratio greater than 4.

18. The composition of claim 1 comprising about 15 to 20 percent (a), about 4 to 8 percent (b), about 4 to 8 percent (c), about 0.5 to 5 percent (d) and about 63 to 75 percent (e).

19. A flame retardant insulation compositions comprising a hydrogenated styrene-butadiene-styrene block copolymer, homopolypropylene, a maleic anhydride functionalized low molecular weight polypropylene wax, an oil plasticizer and a hydrated magnesium hydroxide filler which has been surface treated with a fatty acid metal salt coupling agent.

* * * * *